United States Patent [19]

Kresock et al.

[11] Patent Number: 5,257,041
[45] Date of Patent: Oct. 26, 1993

[54] METHOD AND CIRCUIT FOR DRIVING AN ELECTROMECHANICAL DEVICE RAPIDLY WITH GREAT PRECISION

[75] Inventors: John M. Kresock, Elba; David M. Orlicki, Rochester; Jasper S. Chandler, Rochester; Timothy E. Neale, Rochester, all of N.Y.

[73] Assignee: Eastman Kodak Company, Rochester, N.Y.

[21] Appl. No.: 722,753

[22] Filed: Jun. 28, 1991

[51] Int. Cl.$^5$ ............................................... H94N 1/21
[52] U.S. Cl. ................................. 346/109; 346/139 R
[58] Field of Search ............ 346/1.1, 108, 109, 139 R, 346/107, 76 L

[56] References Cited

U.S. PATENT DOCUMENTS

| | | | |
|---|---|---|---|
| 3,988,743 | 10/1976 | Mitin et al. | 346/109 |
| 4,024,545 | 5/1977 | Dowling et al. | 346/76 L |
| 4,209,224 | 6/1980 | Stewart, Jr. | 350/6.4 |
| 4,482,902 | 11/1984 | Bailey et al. | 346/108 |
| 4,692,877 | 9/1987 | Byerly et al. | 364/514 |
| 4,791,591 | 12/1988 | Asanuma et al. | 364/571.04 |

Primary Examiner—Mark J. Reinhart
Attorney, Agent, or Firm—Robert L. Randall

[57] ABSTRACT

An improved method of, and electrical circuit for driving with precision and accuracy an electro-mechanical device such as a galvanometer is disclosed. The method precisely controls high speed linear scanning of the device in a forward scan segment of each cycle of operation, and further provides very fast re-set of the device without position overshoot during a re-trace segment of a cycle. The electrical circuit includes memory means for generating an electrical command waveform for controlling the device during each cycle of operation, and drive servo means for applying electrical power to the device. The servoing action of this circuit substantially eliminates any difference between an actual position of the device and the position directed by the command waveform during each forward scan segment of a cycle of operation, with the result that each forward scan segment is highly accurate and repeatable. During each re-trace segment of a cycle the circuit re-sets the device at high speed in a way that limits accuracy destroying effects of device overshoot and oscillation.

17 Claims, 4 Drawing Sheets

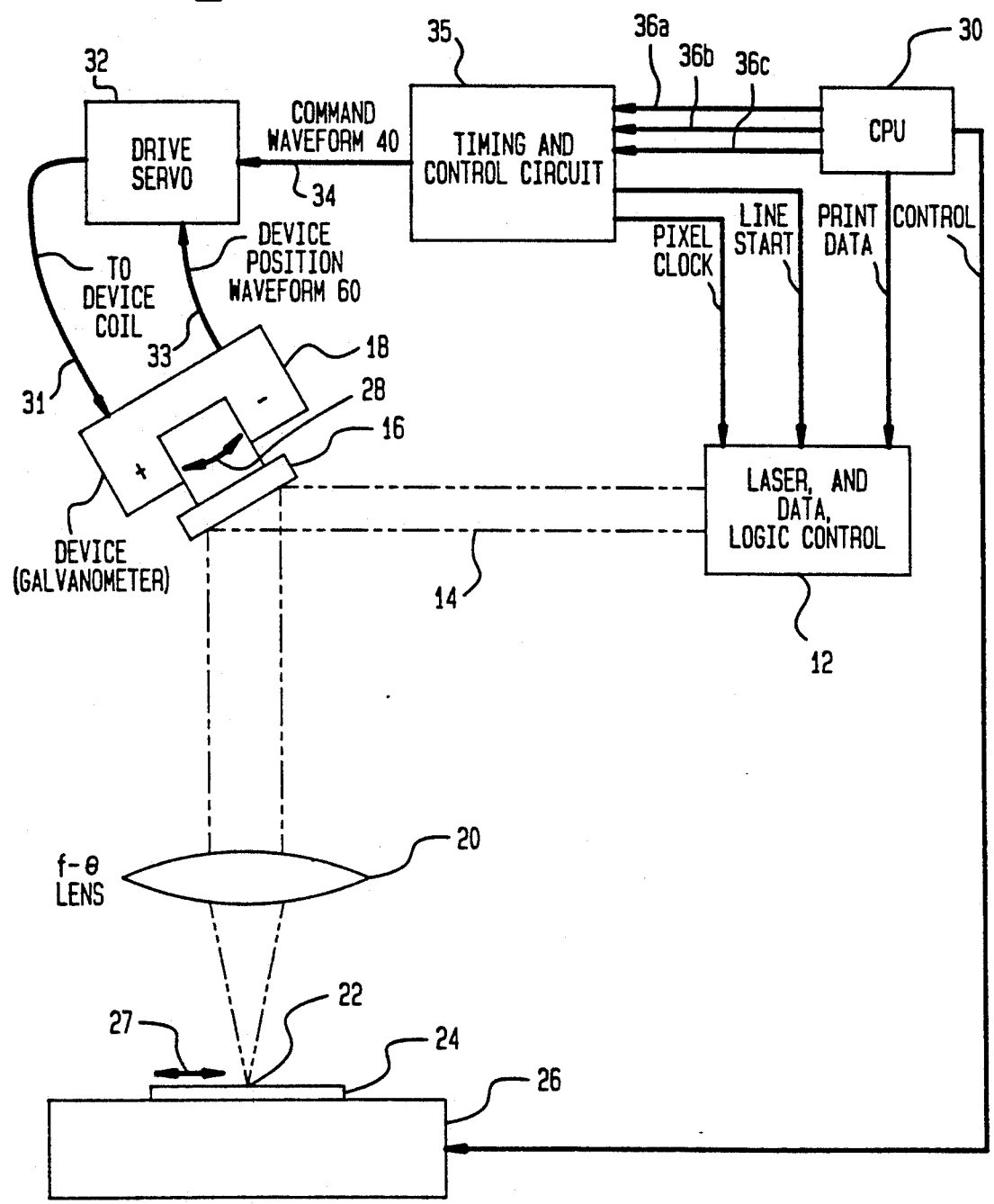

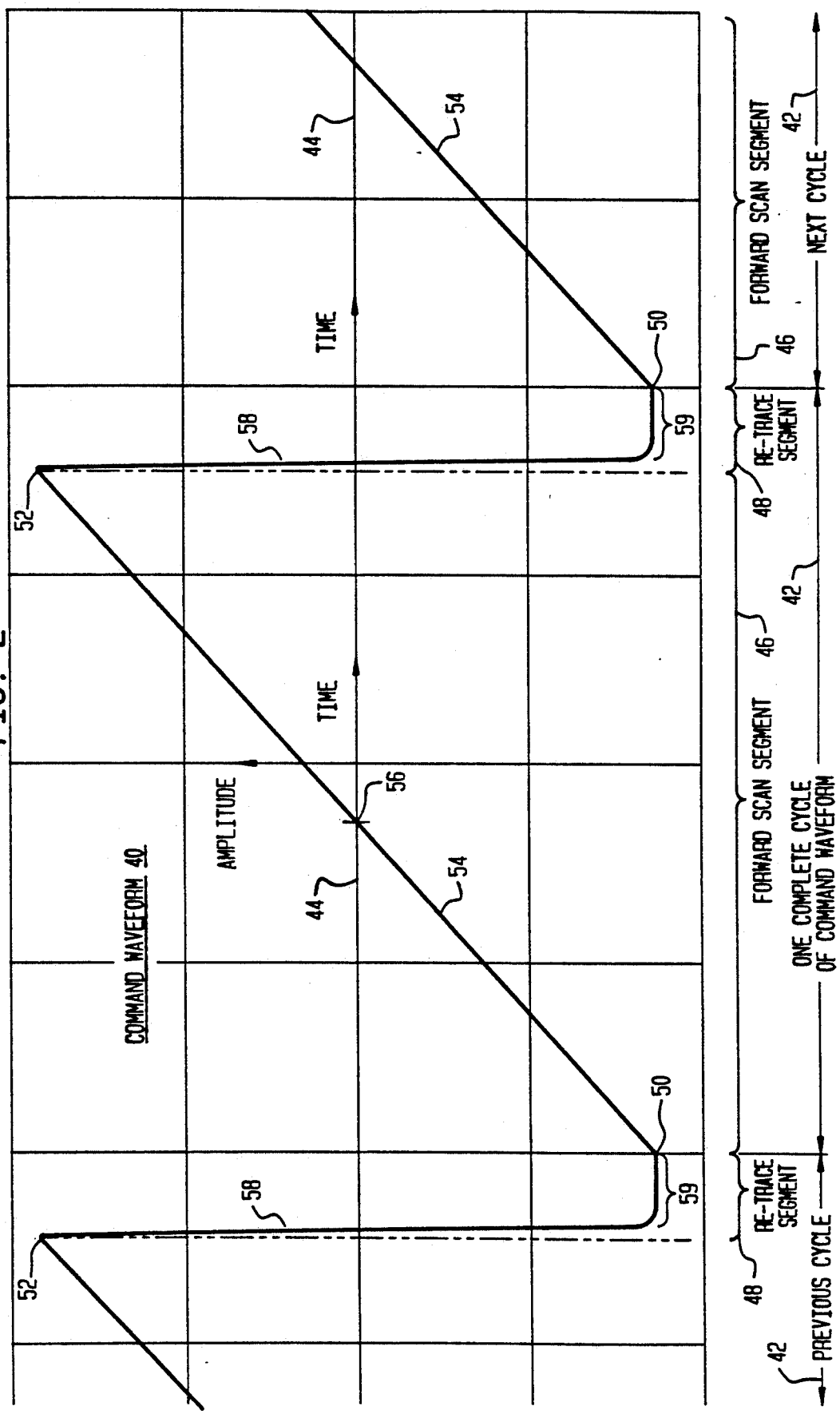

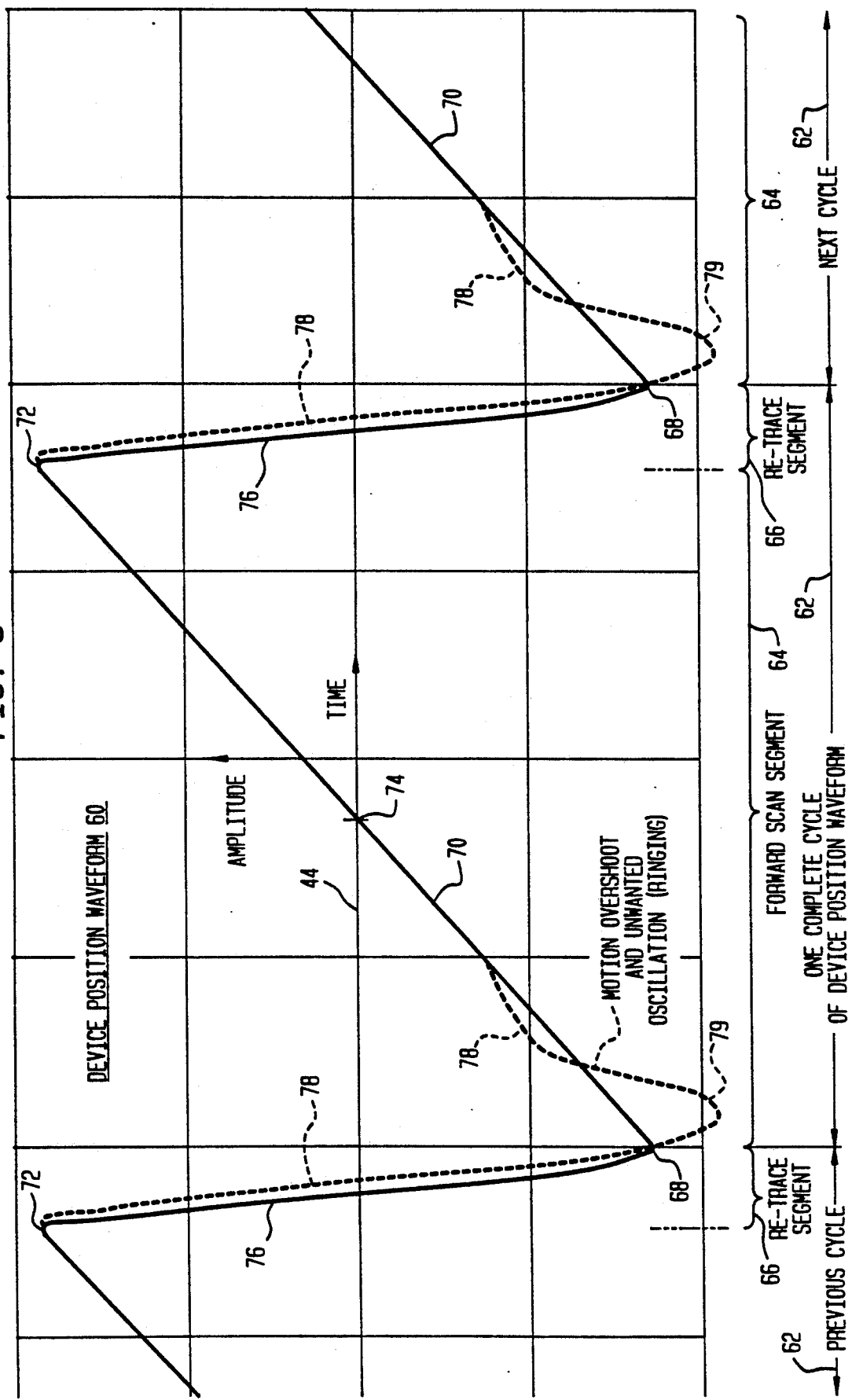

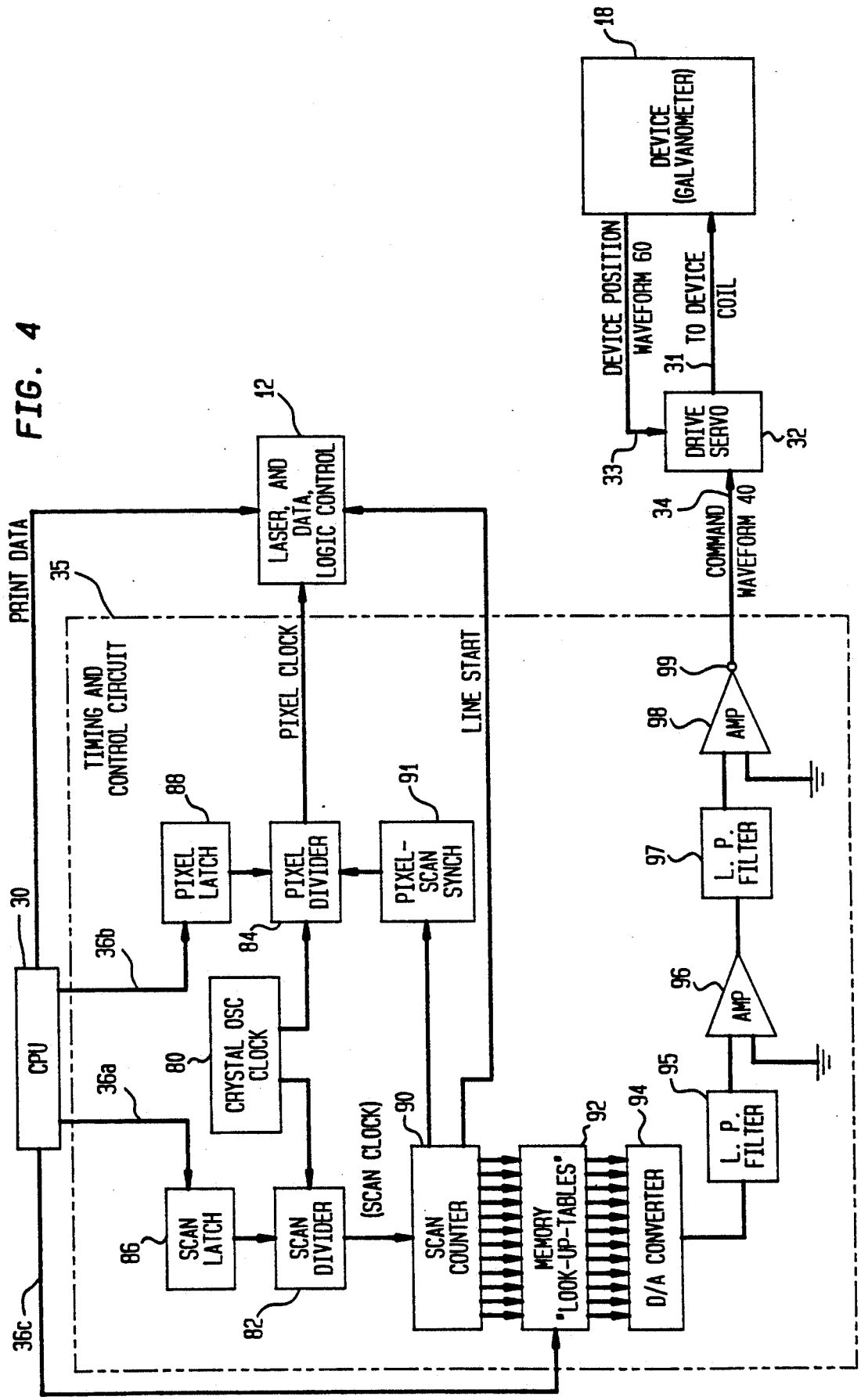

METHOD AND CIRCUIT FOR DRIVING AN ELECTROMECHANICAL DEVICE RAPIDLY WITH GREAT PRECISION

CROSS REFERENCE TO RELATED PATENT APPLICATIONS

The present invention is related to four copending U.S. patent applications. The first related application, Ser. No. 457,593 (S. Sarraf et al., filed Dec. 27, 1990), is entitled "Thermal Printer" and has a common assignee with the present patent application. The second related application, Ser. No. 723,290, which is being filed concurrently with the present patent application, is entitled "Beam Scanning Galvanometer With Spring Supported Mirror", has a common assignee with the present patent application, and has as its inventors, J.S. Chandler, D. Orlicki and J. M. Kresock. The third related application, Ser. No. 723,368, which is being filed concurrently with the present patent application, is entitled "Beam Scanning Galvanometer With Low Inertia Mirror And Magnet", has a common assignee with the present patent application, and has as its inventors, J.S. Chandler, D. Orlicki and J.M. Kresock. The fourth related application, Ser. No. 728,910, which is being filed concurrently with the present patent application is entitled "Magnetic Position Sensor", has a common assignee with the present patent application, and has as its inventor, D. Orlicki, B. Koppe and J.M. Kresock.

FIELD OF THE INVENTION

The present invention relates to an improved method and circuit for driving an electro-mechanical device, such as a galvanometer, rapidly with extreme precision but with much better economy and efficiency than previous systems.

BACKGROUND OF THE INVENTION

This invention is particularly useful in, but not restricted to, a thermal printer such as described in U.S. patent application Ser. No. 457,593, filed Dec. 27, 1990 in the names of S. Sarraf, et al., and assigned to the same assignee. This printer thermally prints an image on a receiver element (e.g., a slide transparency) by scanning a laser beam across a dye donor element sandwiched against the receiver element. The laser beam is modulated by input data corresponding to the image to be printed, and the beam is swept across the receiver element a line at a time by an electro-mechanical galvanometer which rotates a mirror to deflect the laser beam linearly. To obtain sufficiently high resolution, such as is needed in slide transparencies to give a desired degree of sharpness in the projected image, the laser beam is focused through a f-$v$ lens to a spot size of only 7 microns ($\mu$m) onto the element being printed. The spots are written at a pitch of 6 microns to obtain a print resolution of about 4000 dots per inch. To produce an optical image on the slide transparency as nearly perfect as possible, the laser "spots" must be positioned with extreme accuracy (within a micron). This accuracy must be absolutely maintained and repeated during millions of cycles of operation. Moreover, because the image on the slide is being produced sequentially by "writing" a line at a time (rather than all at once), it is necessary that the galvanometer mirror scanning motion be very linear and fast, that it be free of spurious vibrations, and that there be a minimum of idle time during re-positioning (i.e., re-setting) of the galvanometer for the next line scan. These requirements impose difficult-to-meet constraints on the galvanometer mechanism, on its mode of operation, and on its control and drive circuitry.

In the above-identified U.S. patent applications there is described a greatly improved galvanometer mechanism which is incorporated by reference into this patent application. This improved galvanometer has a moving magnet armature inside a stationary electric drive coil which is partially surrounded by an iron pole piece. A low inertia mirror having an optically flat reflecting surface is rigidly mounted on the armature and is adapted to be rotated angularly plus and minus a given amount (such as 7.8 degrees) on either side of a center or rest position. The mirror is placed at an angle of 45 degrees in the path of the laser beam of a thermal printer and when the mirror is rotated from one angular extreme to the other, the beam is scanned linearly across a receiver element being printed. The moving armature of the galvanometer and its mirror are precisely supported by a unique upper and lower spring pivot arrangement, which provides for ease of rotation around a defined axis, but which eliminates friction and strongly resists spurious movements and/or vibrations along other axes or in other directions. The pivot arrangement also provides very accurate and predetermined spring torque which, when the galvanometer and its mirror are at rest, holds them in a centered or zero position. The present invention provides an improved method of, and electrical circuit for, repeatedly scanning such a galvanometer and its mirrored beam along a line. The invention provides substantially greater accuracy and linearity in scanning and also provides for re-positioning the galvanometer and mirror for the next scan very quickly and precisely and with virtually perfect freedom from unwanted oscillations and overshoot than do previous drive arrangements. The present invention is not limited solely to the galvanometer mechanism disclosed in the above-mentioned U.S. patent applications.

SUMMARY OF THE INVENTION

The present invention is directed to an improved method of and electrical circuit for driving and controlling an electro-mechanical device such as the above described galvanometer and its beam deflecting mirror of a thermal printer. A highly accurate linear and repeatable forward scan of the device is obtained in accordance with one aspect of the invention. This is achieved by the steps of generating a command waveform, in the form of an electric signal, having a first (forward) segment during which the amplitude of the waveform rises precisely in accordance with pre-set stored values from an initial value with near perfect accuracy as a function of time to a final value, each such forward segment being regularly repeated with the extreme precision of a crystal controlled clock. At the end of each forward segment of the waveform, a fast re-trace segment of the command waveform is generated wherein the waveform signal is very quickly decreased in amplitude with time from the final value of the preceding forward segment. Then, during another part of the re-trace segment, the amplitude is held at or near a negative value to smoothly transition exactly into the initial amplitude value of the next forward segment. The forward and re-trace segments thus generated provide a command waveform which is used to control and drive the device (e.g., galvanometer) with great accuracy and repeatability during its forward scanning motions. The command waveform, by virtue of its unique non-linear re-trace segment, provides for the necessary high-speed re-setting of the device while also insuring freedom from overshoot and spurious oscillations in the re-trace portion of the device's motion. This mode of re-trace provides for smooth, accurate transition of the device's motion into the next forward scan portion of device motion, and so on with exact repeatability.

Viewed from another aspect, the present invention is directed to a method of repeatedly driving an electro-mechanical device through a cycle of operation which comprises a forward scan portion occurring in a first time period and a subsequent retrace portion occurring in a second time period that is shorter than the first time period. The method comprising the steps of generating a command waveform and a position waveform and applying the command and position waveforms to a servo drive which generates at an output thereof a drive signal waveform.

The command waveform is characterized by a forward scan segment which defines a desired forward motion for the device and by a retrace segment which is non-linear and is shorter than the forward scan segment. The position waveform is indicative of the position of the electro-mechanical device during a cycle of operation thereof. The method further comprises the step of applying the servo drive signal waveform to an input of the electro-mechanical device to control the position and movement of the electro-mechanical device such that the electro-mechanical device moves during the forward scan portion of the cycle of operation in a desired manner consistent with the forward scan segment of the command waveform, and moves during the retrace portion of the cycle of operation so as to cause the electro-mechanical device to move back to an initial starting point of the forward scan portion of the cycle of operation without introducing any overshoot and/or ringing at the beginning of the forward scan portion of the next cycle of operation.

In accordance with another aspect of the invention, there is provided a highly versatile and cost-effective electrical circuit for generating the command waveform, with its forward and re-trace segments, and for driving the device with the desired accuracy and precision. This circuit comprises a crystal clock and counter means, digital memory means for storing in "look-up-tables" the amplitudes versus times of the forward and re-trace segments of a desired command waveform, digital-to-analog converter means for converting the discrete outputs of the memory means into an analog command waveform with desired forward and re-trace segments, and servo drive means for comparing the command waveform with a position signal (i.e., device position waveform) from the device and for electrically driving the device to produce an error-free, highly controlled forward scanning motion in accordance with the command waveform and to give a fast re-trace motion without position overshoot. This circuit is highly versatile, precise in its operation, and is cost effective.

These and other teachings and advantages of the invention will be better understood by considering the following detailed description in conjunction with the accompanying drawings and claims.

BRIEF DESCRIPTION OF THE DRAWINGS

FIG. 1 is a diagram of a laser printer system in accordance with the present invention which includes a device (galvanometer);

FIG. 2 shows an electrical command waveform in accordance with one aspect of the invention for controlling the device of FIG. 1 in a forward scanning segment and in a re-trace segment of each cycle of operation;

FIG. 3 shows a position waveform of the device of FIG. 1 in solid lines with forward and re-trace segments of a cycle of operation in accordance with the invention, and also shows, in dashed lines, position overshoot and oscillation of the device at the end of one re-trace segment and into the next forward scan segment when the device is driven improperly and not in accordance with the present invention; and FIG. 4 shows in block schematic diagram form an electrical circuit in accordance with another aspect of the present invention for controlling and driving an electro-mechanical device.

DETAILED DESCRIPTION

Referring now to FIG. 1, there is shown in schematic form a laser printing system 10 in accordance with the present invention. System 10 comprises a laser, and associated data and logic control 12 which emits a modulated beam of light (light beam) 14 (shown as parallel dashed lines). Beam 14 impinges on a reflecting mirror 16 whose exact angular position is controlled by a device 18, which advantageously is a galvanometer such as described in the above identified U.S. patent applications. Light beam 14, after reflecting from mirror 16, passes through an "f-$\theta$" lens 20 which focuses the beam 14 to a very small spot 22 imaged on a print element (receiver) 24 (e.g., a slide transparency for use with a projector) which is to be printed upon. This element 24 is held and precisely located under light spot 22 by a positioning mechanism 26. The focused light spot 22, which may be only about 7 microns wide, is scanned linearly across print element 24 (as indicated by dual arrow line 27) when the device mirror 16 is rotated about is axis (as indicated by dual arrow curved line 28) from a minus($-$) to a ($+$) position. Data, in the form of dots to be printed on print element 24, is fed into laser 12 from a central processing unit (CPU) 30 and modulates light beam 14 as it is linearly and synchronously scanned across print element 24. CPU 30 is coupled to and also controls positioning mechanism 26.

The device 18, shown here in a rest or center position, is adapted to rotate plus and minus from center by a certain angular deflection, for example $\pm 7.8°$. In swinging from negative to positive deflection, the mirror 16 deflects light beam 14 and its focused spot 22. When it is desired to print with high resolution (e.g., 4000 dots per inch or more), it is necessary for the scan or travel of spot 22 along print element 24 to be extremely linear, very fast, and accurate to an exceptionally high degree. For example, when a light spot 22 is being imaged to print with a resolution of 4000 dots per inch, the positional accuracy of the spot along print element 24 must be within a micron or less. This in turn means that reflecting mirror 16 must be controlled to an even greater degree of accuracy, at high speed, and repeatedly for millions of cycles without variation. Moreover, the mirror 16 must be re-set each cycle at even higher speed, and when being re-set for the next cycle of operation, the mirror 16 must not even slightly overshoot its next starting position, nor have spurious oscillations at the beginning and into the next cycle. Laser beam 14 is turned off during re-set, and is turned on at the beginning of the next cycle. The present invention provides a highly effective and improved way of precisely controlling these forward and re-trace motions of a cycle of operation The device 18, which has an electrical drive coil (not shown), has its coil connected via a power lead 31 to an output of a drive servo 32 of a type well known in the art. Device 18 also includes a position sensing element (not shown) which generates a signal corresponding with great accuracy to the instantaneous position of the device 18 as a function of time. This position sensing element, and the coil of the device, are described in detail in the above identified U.S. patent application titled "Magnetic Position Sensor". This electrical signal from the sensing element of the device 18, hereinafter referred to as the "device position waveform" 60, is coupled via a signal lead 33 to an input of the drive servo 32. A second input of the drive servo 32 is connected via a signal lead 34 to a timing and control circuit 35. During operation circuit 35 applies to an a lead 34 an output electrical signal, hereinafter referred to as a "command waveform" 40. This command waveform 40, described in detail hereinafter, is provided according to the invention to achieve the desired scanning motion of device 18. Each complete cycle of a command waveform 40 is divided into a forward scanning segment and a re-trace segment. By its servoing action the drive servo 32 applies power to the coil of the device 18 via power lead 31 so that during each forward scanning segment of a cycle of operation the actual motion of the device 18 (i.e., its deflection from negative to positive as explained above) conforms precisely with the forward scan segment of the command waveform 40, and so on, cycle after cycle. As will be explained in greater detail hereinafter, the re-trace segment of the command waveform 40 generated by circuit 35 is uniquely shaped so that the circuit 35 is able to drive device 18 at high speed in the reverse direction to re-set it essentially without overshoot or oscillation to begin another forward scanning segment with precisely repeatable accuracy, cycle after cycle. Circuit 35, which receives various synchronizing and control signals from the CPU 30 via a multiple signal path having leads 36a, 36b, and 36c is described in greater detail in connection with FIG. 4.

Referring now to FIG. 2, there is graphically shown the command waveform 40, (e.g., the electrical signal applied by circuit 35 to lead 34) in accordance the present invention. The coordinates of the waveform 40 have been normalized in amplitude and time because the invention is not restricted to a particular set of values. Command waveform 40, for one complete cycle 42 of operation, has a time duration of four horizontal units, and a maximum amplitude from its most negative to its most positive of over three units with approximately equal excursions below and above a horizontal "zero" line indicated at 44. Each cycle 42 is divided into a forward scan segment 46 and a re-trace segment 48. As shown, by way of example, re-trace segment 48 has a duration of only about 15% of a total cycle. During re-trace laser beam 14 is momentarily turned off and the device 18 with its mirror 16 (see FIG. 1) is quickly re-set to its starting position.

At the beginning of a forward scan segment 46, which is also the beginning of a cycle 42, command waveform 40 is at a negative value (indicated at a point 50) and increases with exact linearity over time to a positive value indicated at a point 52. Points 50 and 52 are connected by a straight line portion 54 whose duration is shown as being about 85% of one complete cycle 42. The mid-point of straight-line portion 54, indicated at a point 56, represents a zero value that corresponds to a center or rest position of device 18 (see FIG. 1). During the straight-line forward scan portion 54 of command waveform 40, light spot 22 (see FIG. 1) is scanned precisely and linearly across print element 24 as described above.

After command waveform 40 reaches its upper value 52 at the end of the forward scan segment 46, the waveform 40 begins the re-trace segment 48. During the re-trace segment 48 the waveform follows along a highly non-linear portion (indicated at 58), in accordance with the present invention. The non-linear portion 58 first declines in amplitude from upper point 52 at a very rapid rate and then, along a lower zone 59, runs smoothly and generally horizontally at a lower amplitude into the point 50 at the beginning of the next command waveform cycle 42. In a preferred embodiment of this aspect of the invention, non-linear portion 58 is a generally "L-shaped" curve, with lower zone 59 having a duration almost equal to that of the re-trace segment 48. It should be noted however that the corner or turn from vertical to horizontal shown at the beginning of lower zone 59 of non-linear portion 58 is somewhat rounded as shown. As will be explained hereinafter, forward linear scan segment 46 and re-trace segment 48 may easily be varied in proportion to each other, and the actual time durations of the respective segments may be set independently as desired. If it becomes desirable, for example, to increase the scanning speed of device 18, the time duration of one cycle 42 of a command waveform 40 can be correspondingly decreased without substantially otherwise affecting the overall precision and accuracy of the system. In fact, it is possible to more than triple the scanning speed of device 18, for example from about 20 Hz of cycles 42 to over 70 Hz, by virtue of this aspect of the invention. Re-trace segment 48 may have a duration as short as about 2 milliseconds without affecting overall forward scanning accuracy of device 18. Preferably the re-trace segment should have a duration shorter than about 7 milliseconds. But it is important, as will be explained in connection with FIG. 3, that the non-linear re-trace portion 58 of the re-trace segment 48 not be merely a straight line drawn between upper amplitude point 52 and lower amplitude point 50.

Referring now to FIG. 3, there is shown as a solid line a device position waveform 60 of device 18 (and its mirror 16) of FIG. 1. Waveform 60, which is shown with normalized coordinates corresponding to those of FIG. 2, is generated by the position sensing element (not shown) of the device 18 (of FIG. 1) and is applied via the lead 33 of FIG. 1 to the drive servo 32 of FIG. 1. The waveform 60 shows the position of mirror 16 as a function of time. The device position waveform 60 of FIG. 3 has a complete cycle of operation indicated at 62 which is divided into a forward scan segment 64 and a re-trace segment 66, both of which are shown in solid line. Forward scan segment 64 at the beginning of a cycle 62 starts from a negative amplitude point 68 and proceeds uniformly along a straight-line portion 70 to a positive amplitude point 72. A mid-point along straight-line portion 70, indicated at 74, corresponds to a center or rest position of device 18 in FIG. 1 and horizontal "zero" line 44 is the same in FIG. 3 as in FIG. 2. As seen here in FIG. 3, the actual position of the device 18 during forward scan (and its focused light spot 22) is an exactly linear function of amplitude versus time. In effect, actual device position in amplitude and time along straight-line (linear) portion 70 coincides precisely with the desired position in amplitude and time that is being "commanded" during the straight-line portion 54 of the forward scan segment 46 of command waveform 40 of FIG. 2. In other words, the straight line portion 70 of the device position waveform 60 of FIG. 3 can be thought of as being essentially "congruent" with the straight-line portion 54 of the command waveform 40 of FIG. 2. This mode of operation precisely controls and monitors the instantaneous position of light spot 22 as it is being scanned linearly across print element 24, and results in a highly accurate, fast and exactly repeatable forward scanning operation of the light spot.

When the device position waveform 60 reaches the positive amplitude point 72, which is at the end of a forward scan segment 64, the waveform 60 begins a re-trace segment 66, and proceeds along a rapidly declining, smoothly curved solid line portion 76, to the beginning of the next forward scan segment 64 at a negative amplitude point 68. It is important that curved portion 76 at the end of a re-trace segment 66 of device motion transition smoothly into the next forward scan segment 64 without essentially any overshoot and without essentially any oscillation into the next forward segment. Thus the next cycle of device motion begins at negative amplitude point 68 and proceeds precisely along the next straight-line portion 70 of the forward scan segment 64. It should be noted here that the shape of command re-trace portion 58 (of FIG. 2) is substantially different from that of the device position re-trace portion 76 shown in FIG. 3. Any difference in the command re-trace portion 58 and position re-trace portion 76 which may exist is a result of the high speed at which the device 18 is driven during re-trace and the greatly increased effect of device inertia. There are also practical limitations in peak electrical power which can be instantaneously applied to the device 18. The important thing however, as is explained above, is that device motion near the end of re-trace portion 76 in FIG. 3 makes a transition smoothly and without substantially any overshoot or oscillation, at negative point 68, into the next forward linear portion 70.

If the non-linear re-trace portion 58 of the command waveform 40 of FIG. 2 is not properly shaped, for example, if the re-trace portion 58 were merely a straight line running from upper point 52 to lower point 50, there will result unwanted overshoot and harmful oscillations (ringing) in the actual motion of the device 18 being controlled by the command waveform 40. An undesirable condition such as this is destructive of the forward scanning accuracy of light spot 22.

As seen in FIG. 3, a dashed line curve of position indicated at 78 shows the actual motion of the device when driven with a command waveform (e.g., a straight-line re-trace between points 52 and 50 of FIG. 2) not in accordance with the present invention during position waveform re-trace segment 66. This results in considerable negative overshoot to a point 79, a point well below the desired starting point 68 of the next forward scan segment 64. The undesired motion of device 18 along dashed-line curve 78 further continues well into the next forward scan segment 64, there being substantial deviation or oscillation below and then above the desired straight-line portion 70. Of course, the degree of unwanted overshoot of device 18 (e.g., to the point 79 shown in FIG. 3) becomes less severe, though still unacceptable, as the re-trace segment 66 is made somewhat longer in absolute duration (e.g., from about 2 milliseconds to about 7 milliseconds). The accuracy-destroying condition illustrated by dashed-line curve 78 is prevented however, by virtue of the present invention. The desired motion of device 18 shown by solid-line re-trace portion 76 and forward scan portion 70 in FIG. 3, and the undesirable motion of device 18 shown by dashed-line curve 78 are based on actual oscillographs of motion of device 18 for the same re-trace times, and using the same device 18 and electrical circuitry, but with the above-described differences between the re-trace segments of the command waveform 40.

Referring now to FIG. 4, there is shown within a dashed line rectangle a preferred embodiment of the timing and control circuit 35 of FIG. 1. This circuit 35 via its output signal lead 34 controls drive servo 32, and together the circuit 35 and the drive servo 32 control the power applied to device 18 via the lead 31 (see also FIG. 1). The circuit 35 comprises a crystal oscillator clock 80, a scan divider 82, a pixel divider 84, a scan latch 86, a pixel latch 88, a scan counter 90, a pixel scan synch 91, memory "look-up-tables" 92, a digital-to-analog converter 94, a first low pass filter 95, a first linear amplifier 96, a second low pass filter 97, a second linear amplifier 98, and an output signal terminal 99. These elements of circuit 35 are connected together and perform as follows. As seen at the upper left of FIG. 4, the precise timing of the circuit 35 is provided by a crystal oscillator clock 80 operating at, for example, about 3.6 MHz, and having an output which is applied at the left to the scan divider 82, and applied at the right to the pixel divider 84. The amount by which scan divider 82 divides or counts down the frequency of oscillator clock 80 is set to a desired value by a scan latch 86 which in turn is controlled by a signal from the CPU 30 via signal lead 36a of FIG. 1. Once scan latch 86 has been set, scan divider 82 produces one count or digital signal for a pre-determined number of oscillations of clock 80. Similarly, the pixel divider 84 is set to a count down divisor number by the pixel latch 88 which is controlled by CPU 30 via signal lead 36b. Thus the scan count and the pixel count can be set independently to desired values both driven by the same clock 80.

An output signal from the scan divider 82 is applied to an input of the scan counter 90 which generates for an output, in the example shown, a 12-bit binary number in accordance with each synchronous time signal from divider 82. Using only 12 bits, the counter 90 can count to 4,096 signals before beginning again. By way of further explanation, scan counter 90 in fact has the capability of generating a 16-bit digit. If all 16 bits were used, the counter would be able to count up to 65,536 time signals before repeating. An output of the scan counter 90 is applied to the pixel scan synch unit 91, which also controls pixel divider 84 so that its "pixel clock" signal is absolutely synchronized with a scan "line start" signal from scan counter 90. These "pixel clock" and "line start" signals are applied to laser data control 12 (FIG.

1) to synchronize its operation with that of circuit 35 shown in FIG. 4.

The binary count signals (12 bits shown) from scan counter 90 give a digitized count of time intervals and are applied in parallel to a memory 92 which is advantageously an electronically programmable read-only memory (EPROM). A 64K, 16 bit EPROM unit of this kind for example costs only about $5 and consequently is highly cost effective for use here in the timing and control circuit 35. As will be explained presently, memory 92 provides an extremely versatile, highly accurate and cost effective way of generating with great accuracy and resolution a command waveform 40 (FIG. 2) having a forward linear scan segment 46 of a desired amplitude and time duration together with a much faster re-trace segment 48 having a quite different non-linear (e.g., "L-shaped") portion 58.

As memory 92 counts through the binary numbers (representing time intervals synchronized by the clock 80) applied to it by scan counter 90, the memory 92 generates at its outputs a 12-bit binary number whose value at any particular time interval or count is determined by the memory levels already digitally stored in memory 92. These memory levels thus serve as "look-up-tables" where the desired amplitude values of a command waveform 40 are written down in binary bit form and presented to a output when called for by a given input bit count to memory 92. With memory 92 removed from circuit 35 desired memory levels are pre-loaded into memory 92 by signals applied to it from an EPROM programmer (not shown). The output numbers from memory 92 are applied in parallel (12 bits are shown, but 16 bits are available if greater resolution is needed) to inputs of a digital-to-analog (D/A) converter 94 which converts the binary number values from memory 92 into a continuous analog signal. An output signal from D/A converter 94 is applied in sequence to the first low-pass (LP) filter 95, the first linear amplifier 96, the second LP filter 97 and the second linear amplifier 98 which are connected in series. The combined action of these filters and amplifiers produces at an output terminal 99 the command waveform 40, substantially as shown in FIG. 2, which is now free of digital switching noise. The command waveform 40 may be halted at the mid-point 56 of its linear scan portion 54 for a short time as may be required during loading of another print element 24 or re-setting of positioning mechanism 26 shown if FIG. 1. This halt is effected by a "disable" signal (not shown) from CPU 30 via signal lead 36c (see FIG. 1) applied to circuit 35 and to its memory 92 as shown in FIG. 4.

Referring still to FIG. 4, the command waveform 40 at terminal 99 is applied via the lead 34 to an input of the drive servo 32, the output of which via the power lead 31 (see also FIG. 1) supplies electrical drive power to the coil of the device 18. An electrical signal from the device 18 giving its actual position with time (i.e., device position waveform 60 of FIG. 3) is returned from the device 18 via a lead 33 to another input of the drive servo 32. The servoing action of the drive servo 32 when supplying power to the device 18, senses and acts to correct any instantaneous differences between the device position waveform 60 and the command waveform 40. Drive servo 32 is thus able to eliminate substantially all difference between device position waveform 60 and command waveform 40 during their forward linear scan segments and to minimize and negate the accuracy-destroying effects of any differences between the waveforms in their re-trace segments, as explained above in connection with FIGS. 2 and 3.

As mentioned above, memory 92 shown in FIG. 4, using only 12 bits of output to D/A converter 94, has 4,096 time intervals per cycle. It also has up to 4096 amplitude levels. This enables it to give very high resolution to the command waveform 40. But by using the full 16-bit capability of memory 92, a resolution many times higher can be obtained. Moreover, speed of operation of the device can be easily programmed over a wide range without impairing accuracy and precision. Thus circuit 35 provides a versatile, easily setable, highly accurate, and cost effective timing and control means for the device 18.

It is to be understood that the embodiments of method and circuit described herein are illustrative of the general principles of the invention. Modifications may readily be devised by those skilled in the art without departing from the spirit and scope of the invention. For example, component elements of circuit 35 may be changed and the exact shapes of the segments of the command waveform 40 as shown may be varied. Moreover, the invention is not restricted to the laser printer system shown in FIG. 1, or to a particular device (galvanometer) 18.

What is claimed is:

1. A method of repeatedly driving an electro-mechanical device through a cycle of operation which comprises a forward scan portion occurring in a first time period and a subsequent re-trace portion occurring in a second time period that is shorter than the first time period, said method comprising the steps of:

generating a command waveform which is characterized by a forward scan segment which defines a desired forward motion for the device and by a re-trace segment which is non-linear and is shorter than the forward scan segment;

generating a position waveform which is indicative of the position of the electro-mechanical device during a cycle of operation thereof;

applying the command and position waveforms to a servo drive which generates at an output thereof a drive signal waveform; and applying the servo drive signal waveform to an input of the electro-mechanical device to control the position and movement of the electro-mechanical device such that the electro-mechanical device moves during the forward scan portion of the cycle of operation in a desired manner consistent with the forward scan segment of the command waveform, and moves during the re-trace portion of the cycle of operation so as to cause the electro-mechanical device to move back to an initial starting point of the forward scan portion of the cycle of operation without introducing any overshoot and/or ringing at the beginning of the forward scan portion of the next cycle of operation.

2. A method for repeatedly driving a device in a forward scan direction and then in a re-trace direction comprising the steps of:

generating successive cycles of a command waveform having a forward scan segment of desired duration and changing amplitude in a first direction, and having a re-trace segment characterized by a nonlinear portion which first quickly changes in amplitude in a second direction at the end of the forward scan segment and then reaches another amplitude to run smoothly into the beginning of the next forward scan segment;

applying the command waveform to a first input of a servo drive whose output drives the device in both the forward scan segment and the re-trace segment of the command waveform;

applying a position waveform generated by the device to a second input of the servo drive;

comparing the position waveform to the command waveform in the servo drive and driving the device in the forward scan segment so that actual device motion conforms precisely with the forward scan segment of the command waveform; and driving the device during the re-trace segment of the command waveform to re-set the device at high speed with substantially no overshoot and ringing to an exact position at the beginning of another forward scan segment, and so on.

3. The method of claim 2 wherein the non-linear re-trace portion of the command waveform is generally "L-shaped".

4. The method of claim 2 wherein the forward scan segment is highly linear and is about 85% of a cycle, and said re-trace segment is about 15%.

5. The method of claim 2 wherein said cycles of operation have a frequency in the range from about 20 Hz to at least 70 Hz; and the re-trace segment is a generally "L-shaped" curve having a lower zone, the duration f said lower zone being nearly equal to the duration of the re-trace segment.

6. A method for driving with great accuracy and repeatability at high speed a device such as a galvanometer to scan a light beam in a highly linear, precisely registered forward scan direction and then very quickly re-setting the device in a re-trace direction and so on, during numerous cycles of operation, comprising the steps of:

generating successive cycles of a command waveform, each of said waveforms characterized by a highly linear forward scan segment of pre-determined duration and uniformly increasing amplitude from a negative point to a positive point in a first time period, said command waveform also being characterized by a re-trace segment having a non-linear portion which rapidly declines in amplitude from said positive point at the end of said forward scan segment and then proceeds at a lower amplitude to run smoothly into the beginning of the next forward scan segment at a next one of said negative points;

generating a device position waveform; and applying the command and position waveforms to inputs of a drive servo whose output is coupled to a power input of the device such that during a forward scan segment the device position waveform conforms precisely with said forward scan segment of the command waveform, and such that the device is re-set very quickly during said re-trace segment of command waveform with substantially no overshoot and ringing to a predetermined position at the beginning of another forward scan segment, and so on.

7. The method of claim 6 wherein said non-linear re-trace portion of said command waveform is a generally "L-shaped" curve, and has a duration very much shorter than the duration of said forward scan segment.

8. The method of claim 6 wherein said cycles of operation have a frequency in the range from about 20 Hz to over 70 Hz; and the said re-trace segment is a generally "L-shaped" curve, the lower amplitude of which proceeds for most of the duration of the re-trace segment, the duration of said re-trace segment being less than about 7 milliseconds.

9. A circuit for controlling and driving an electro-mechanical device, said circuit comprising:

timing and counter means for generating clock signals at precise intervals;

digital memory means for storing in look-up-tables the desired amplitudes versus incremental time intervals of a command waveform, said waveform having a desired forward scan segment of given duration and having a non-linear re-trace segment of much shorter duration, said memory means being driven by said timing and counter means and being pre-set with the desired amplitudes of a complete command waveform as binary numbers;

converter means for converting the binary signals from the look-up tables of said memory means into an analog command waveform;

signal means for obtaining an electrical position waveform showing the actual motion of the device; and servo drive means connected to said converter means and said signal means for electrically driving the device in accordance with said analog command waveform, said servo drive means substantially eliminating at each instant differences between said position waveform and said command waveform during the desired forward scan segment of the command waveform, said servo drive means limiting the effects of overshoot and oscillation in device motion near the end of a re-trace segment and into the next forward scan segment of said command waveform so that the device can be driven in a forward scan direction exactly in conformity with said analog command waveform, and the device can be re-set during a re-trace segment without loss of accuracy to begin another, forward scan segment.

10. The circuit of claim 9 wherein said timing and counter means can be pre-set to determine a desired duration of a command waveform, such that the device can easily be driven over a three-to-one range in speed.

11. The circuit of claim 9 wherein said digital memory means is an EPROM, and the command waveform is stored with very high resolution as binary numbers in the look-up-tables.

12. An electrical control and drive circuit for driving with great accuracy and repeatedly at high speed an electro-mechanical device such as a galvanometer and for scanning it in a forward direction with exact linearity, said circuit comprising:

an electro-mechanical device having an electric drive coil, and having a position sensing element for sensing the position of the device and for generating a device position waveform;

timing and counter means for generating clock signals at precise intervals;

digital memory means for storing in look-up-tables the desired amplitudes versus incremental time intervals of a desired command waveform, said waveform having a highly linear forward scan segment of given duration, and having a non-linear re-trace segment of much shorter duration, said memory means being driven by said timing and counter means and being pre-set with the desired amplitudes of a complete waveform as binary numbers;

D/A converter, filter and amplifier means for converting the binary signals from the look-up tables of said memory means into an analog command waveform which conforms precisely with said desired command waveform; and servo drive means for servoing the device position waveform against the analog command waveform and for applying electrical power to the coil of said device, said servo drive means substantially eliminating at each instant differences between said analog command waveform and said device position waveform during the highly linear forward scan segment of said analog command waveform, said servo drive means further minimizing and negating the effects of overshoot and oscillation in device position near the end of a re-trace segment of said analog command waveform and into the next highly linear forward scan segment of said analog command waveform so that said device can be driven in a highly linear forward scan direction exactly in conformity with said analog command waveform, and said device can be re-set at very high speed during a re-trace segment of said analog command waveform without loss of accuracy to begin another forward scan segment.

13. The circuit of claim 12 wherein said timing and counter means can be pre-set to determine the total duration of one cycle of a desired command waveform, whereby the device can easily be driven over a three-to-one range in speed.

14. The circuit of claim 12 wherein said digital memory means is pre-set by electrical signals applied to it whereby the exact shapes and durations of the forward and the re-trace segments of a desired command waveform are easily put into said memory.

15. The circuit of claim 12 where said timing and counter means comprises:

a high frequency crystal oscillator clock;

divider means for pre-setting a desired count divisor for said oscillator clock; and scan counter means for driving said memory means, whereby the frequency of each cycle of said desired command waveform can easily be set in the range from about 20 Hz to about 70 Hz.

16. The circuit of claim 14 wherein said desired command waveform stored in said digital memory means has a re-trace segment which is somewhat "L-shaped", the duration of said re-trace segment being as short as about 2 milliseconds and less than about 7 milliseconds.

17. A printing system having an electro-mechanical device comprising:

a circuit for controlling and driving the electro-mechanical device, said circuit comprising:

timing and counter means for generating clock signals at precise intervals;

digital memory means for storing in look-up-tables the desired amplitudes versus incremental time intervals of a command waveform, said waveform having a desired forward scan segment of given duration and having a non-linear re-trace segment of much shorter duration, said memory means being driven by said timing and counter means and being pre-set with the desired amplitudes of a complete command waveform as binary numbers;

converter means for converting the binary signals from the look-up tables of said memory means into an analog command waveform;

signal means for obtaining an electrical position waveform showing the actual motion of the device; and servo drive means connected to said converter means and said signal means for electrically driving the device in accordance with said analog command waveform, said servo drive means substantially eliminating at each instant differences between said position waveform and said command waveform during the desired forward scan segment of the command waveform, said servo drive means limiting the effects of overshoot and oscillation in device motion near the end of a re-trace segment and into the next forward scan segment of said command waveform so that the device can be driven in a forward scan direction exactly in conformity with said analog command waveform, and the device can be re-set during a re-trace segment without loss of accuracy to begin another forward scan segment.

* * * * *